(12) United States Patent
Mastroianni et al.

(10) Patent No.: US 7,761,675 B2
(45) Date of Patent: Jul. 20, 2010

(54) FLASH MEMORY DEVICE WITH IMPROVED MANAGEMENT OF PROTECTION INFORMATION

(76) Inventors: Francesco Mastroianni, Viale Montenero, 62, Milan (IT) 20135; Antonino Mondello, Via Comunale Sanzo, 370/A, Messina (IT) 98148; Elena Cussotto, Via Asti, 13, Moncalvo (IT) 14036; Massimiliano Mollichelli, Via Pastore, 88, Arcore (IT) 20043; Mauro Sali, Via Lega Lombarda, 8/B, S. Angelo Lod. (IT) 26866

( * ) Notice: Subject to any disclaimer, the term of this patent is extended or adjusted under 35 U.S.C. 154(b) by 512 days.

(21) Appl. No.: 11/432,301

(22) Filed: May 10, 2006

(65) Prior Publication Data
US 2007/0016735 A1    Jan. 18, 2007

(30) Foreign Application Priority Data
May 11, 2005    (IT)    .......................... MI2005A0838

(51) Int. Cl.
    *G06F 12/00*    (2006.01)

(52) U.S. Cl. ...................................... 711/163; 711/103
(58) Field of Classification Search ................ 711/103, 711/5, 163, 164; 713/1, 100, 2; 714/42; 369/53.21; 365/189.05
See application file for complete search history.

(56) References Cited

U.S. PATENT DOCUMENTS

| | | | |
|---|---|---|---|
| 7,339,869 B2* | 3/2008 | Ishibashi et al. | 369/53.21 |
| 2003/0200235 A1* | 10/2003 | Choy et al. | 707/203 |
| 2004/0034817 A1* | 2/2004 | Talagala et al. | 714/42 |
| 2004/0220879 A1* | 11/2004 | Hughes | 705/57 |
| 2005/0276125 A1* | 12/2005 | Kido et al. | 365/189.05 |

\* cited by examiner

*Primary Examiner*—Pierre-Michel Bataille
(74) *Attorney, Agent, or Firm*—Blakely, Sokoloff, Taylor & Zafman LLP

(57) ABSTRACT

A non-volatile memory device of flash type includes first memory cells for storing data, second memory cells for storing protection information of the first memory cells, and a circuit for updating the protection information that includes a circuit for writing a plurality of versions of the protection information in the second memory cells, and a circuit for identifying a current version of the protection information.

19 Claims, 3 Drawing Sheets

FLASH MEMORY DEVICE WITH IMPROVED MANAGEMENT OF PROTECTION INFORMATION

BACKGROUND OF THE INVENTION

1. Field of the Invention

The present invention relates to the field of the non-volatile memories and, more specifically, to the management of protection information in non-volatile memory devices of flash type.

2. Description of the Related Art

Flash memory devices are non-volatile memories wherein each cell can be programmed electrically, but a large number of cells, which form a sector, have to be erased at the same time. This allows obtaining a very simple structure of the memory device, which can be manufactured at low cost and with a high density thereby being well suited to several applications.

Generally, a supplementary sector is provided inside the memory device for storing protection information of the (actual) sectors. A reading operation can be performed on each sector; however, an erasing operation or a programming operation is allowed on non-protected sectors only. This mechanism preserves the memory device from undesired erasing and/or programming operations, thereby avoiding any loss of data stored therein.

For example, those memory devices are used in digital systems such as the set-top boxes for DTT (acronym for Digital Terrestrial Television) applications; in such case, the protection information allows stopping the access to the sectors that are used for storing configuration information, such as the identification codes and the activation codes of the different services.

The protection information is updated by overwriting the corresponding sector with a new value. This operation implies the saving of the protection information in a volatile buffer memory, and thus the erasing of the whole protection sector; subsequently, the memory cells of the protection sector can be programmed for obtaining the desired value of the protection information.

A drawback of the above-described solution is that each update of the protection sector needs both an erasing operation and a programming operation. Thus, the updating operation is relatively slow.

Moreover, during each erasing and programming operation the memory cells of the protection sector are subjected to an electric stress; after repeated updating cycles this can cause the loss of the information stored in the protection sector.

In addition, a possible supply voltage drop during the erasing phase of the protection sector could leave it in an erroneous configuration (for example, so as all the sectors of the memory are non-protected from updating operations).

BRIEF SUMMARY OF THE INVENTION

The disclosed embodiments of the present invention provide a solution that is based on the idea of writing multiple versions of the protection information.

In particular, an aspect of the present invention proposes a non-volatile memory device of the flash type. The memory device includes first memory cells for storing data and second memory cells for storing protection information of the first memory cells. The memory device further includes means for updating the protection information. Such means for updating includes means for writing a plurality of versions of the protection information in the second memory cells, and means for identifying a current version of the protection information.

In one embodiment of the invention, the current version of the protection information is updated until the erasing operation of some corresponding memory cells is required.

Typically, the protection information includes a protection bit for each sector of the memory device.

Advantageously, each bit is indicative of the protection or of the non-protection of the sector when the corresponding memory cell is programmed or erased, respectively.

A further embodiment of the present invention provides reserving a further memory cell for each version of the protection information (with the number of such cells being programmed that identifies the current version).

As a further improvement, the memory cells that store the various versions of the protection information and that identify the current version are included in the same sector.

Moreover, it is possible to use such sector for storing generic data as well.

Preferably, the writing operation of the new version of the protection information is inhibited at the reaching of a predefined maximum number thereof.

Alternatively, when such event occurs, the sector is erased for re-starting the process with a first version of the protection information.

A further aspect of the present invention provides a corresponding method for operating a non-volatile memory device of flash type.

In accordance with another embodiment of the invention, a method for operating a nonvolatile memory device of flash type including first memory cells for storing data and second memory cells for storing protection information of the first memory cells is provided. The method includes updating the protection information by writing a plurality of versions of the protection information in the second memory cells and identifying a current version of the protection information. Ideally modifying the current version in response to a request to update is done without erasing corresponding second memory cells. In addition, writing a new version of the protection information and erasing at least one of the corresponding second memory cells is also another aspect of the present invention.

In accordance with another embodiment of the invention, a circuit is provided that includes a memory circuit having first and second memory cells and adapted to store a plurality of versions of protection information in the second memory cells. The circuit is further adapted to identify a current version of the protection information from the plurality of versions of the protection information. Preferably data is stored in the first memory cells.

In accordance with another aspect of the foregoing embodiment, the memory circuit is adapted to update the current version of the protection information without erasing any of the second memory cells. Also, in accordance with another embodiment, the memory circuit is adapted to write protection information and erase at least a portion of the second memory cells.

In accordance with another aspect of the foregoing embodiment, the memory circuit includes third memory cells adapted to store versions of the protection information.

In accordance with another aspect of the foregoing embodiment, protection bits associated with at least the first and second memory cells protect against writing and erasing of selected cells in this second memory cell. This can be further extended to the third memory cells.

BRIEF DESCRIPTION OF THE SEVERAL VIEWS OF THE DRAWINGS

The features and the advantages of the present invention will be best understood by reference to the following detailed description, given purely by way of a non-restrictive indication, to be read in conjunction with the accompanying drawings. In particular.

DETAILED DESCRIPTION OF THE INVENTION

Figure 1:
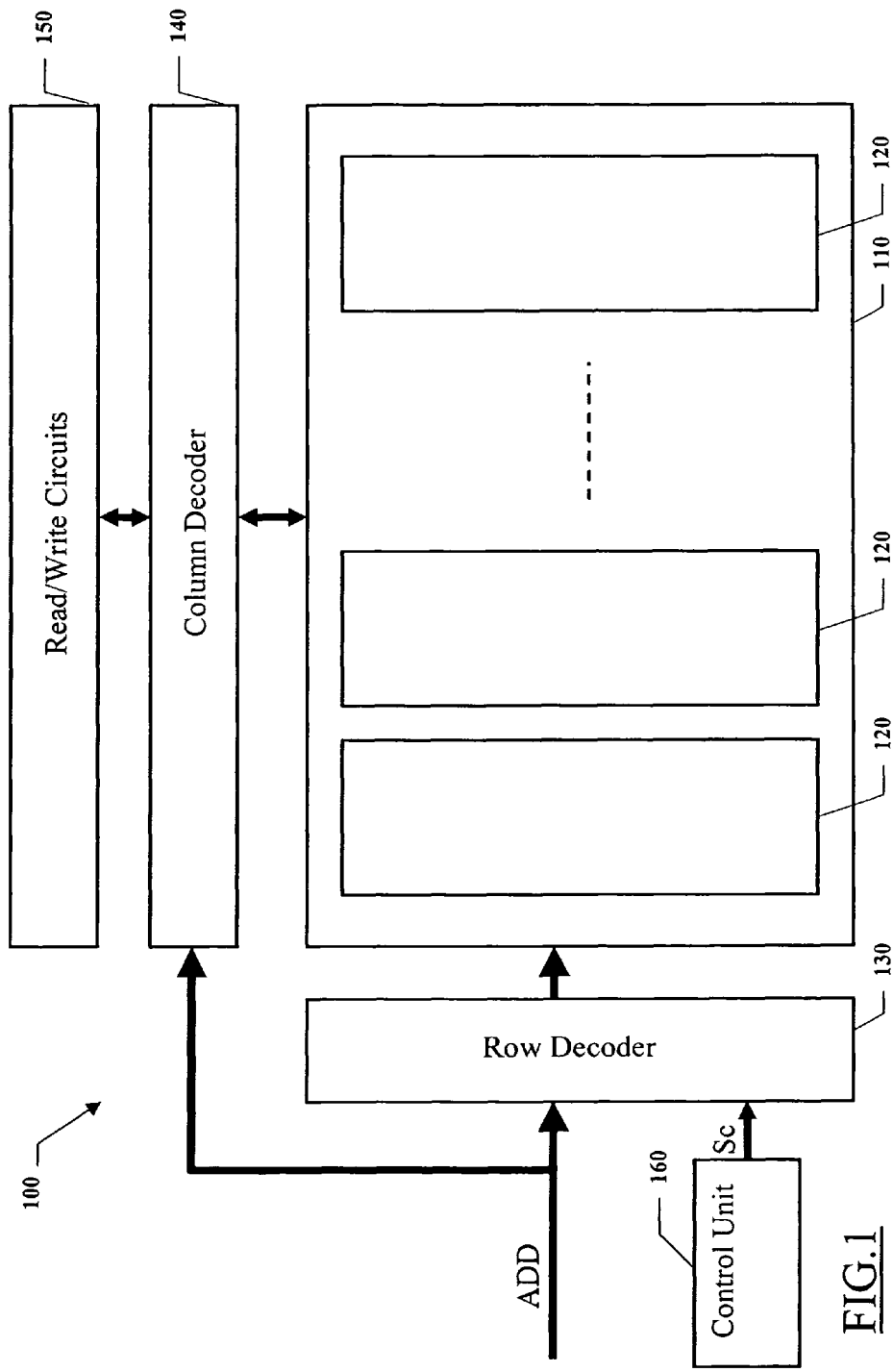
FIG. 1 shows a schematic block diagram of a memory device in which the solution according to an embodiment of the present invention is usable.

Referring in particular to FIG. 1, a non-volatile memory device of flash type 100 is shown. The memory device 100 includes a matrix 110 of cells that are typically floating gate MOS transistors although other transistor types may be used; the matrix 110 is partitioned in several sectors 120 (for example, 16), each one being individually erasable. Typically, each cell stores the logical value "1" when it is erased and the logical value "0" when it is programmed.

The memory device 100 receives an address ADD from the outside. A portion of the address is provided to a row decoder 130 and another portion of the address ADD is provided to a column decoder 140; the decoders 130, 140 select a block of memory cells (for example, 8), which store a word (8 bits in the case at issue) being processed in parallel.

The column decoder 140 interfaces with read/write circuits 150, which include all components (for example, sense amplifiers, comparators and similar circuits) that are required for the conventional operations (i.e., reading, writing and erasing operations) performed on the memory device 100.

The memory device 100 further includes a control unit 160 that provides the signals (denoted as a whole with Sc) that are used for driving the various components of the memory device 100.

The matrix 110 can be used for storing data of various type into apparatus for digital applications (for example, the set-top boxes), such as personal data, accessing codes, service activation codes, log of performed operations, and like.

Instead, as described in detail in the following, a dedicated portion of the matrix 110 is used for storing protection information of the sectors 120. In particular, the protection information includes a protection bit for each sector 120. For example, when the protection bit is at the logical state '1', the corresponding sector 120 is non-protected from updating operations of the stored data; vice versa, when the protection bit is at the logical state '0' the corresponding sector 120 is protected from updating operations (and thus accessible by reading operations only).

Figure 2:
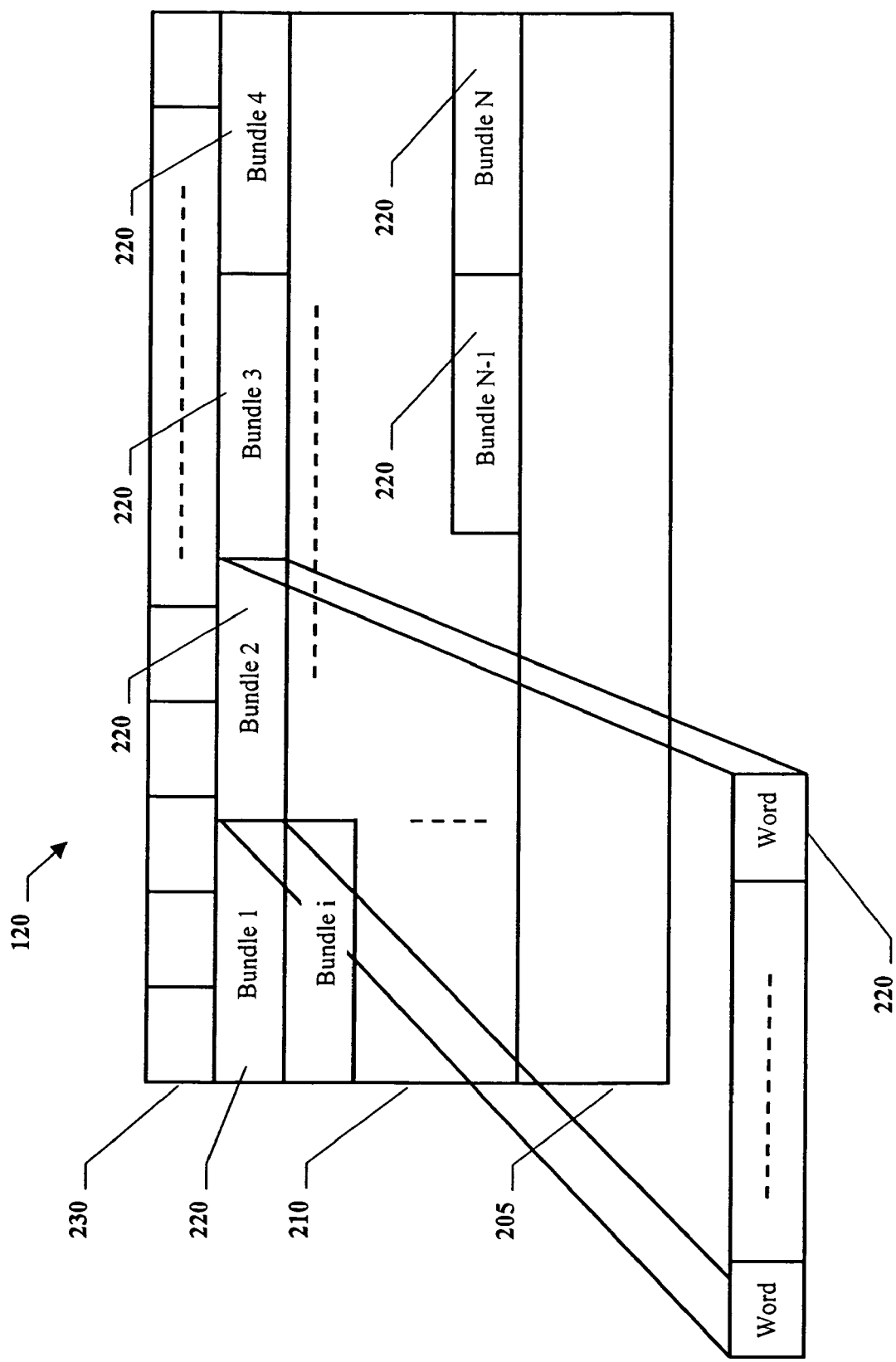
FIG. 2 shows a schematic block diagram of a sector of the memory device according to an embodiment of the present invention.

Moving now to FIG. 2, a specific sector of the memory device 120 is represented. The sector 120 is partitioned into a first subset 205 of memory cells that are used for storing data and a second subset 210 of memory cells that are used for storing the protection information.

More in detail, the subset 210 includes a series of N bundles of memory cells 220 (for example, N=32). Each bundle 220 is used for storing a different version of the protection information; thus, the bundle 220 is formed by a number of memory cells equal to the number of the sectors (in such case 16) of the memory device (one for each protection bit). In general, the protection bits stored in the bundle 220 are grouped in various words (in the example at issue, 16/8=2 words).

The subset 210 further includes a control structure 230, which stores a pointer to a current bundle 220 (which stores a current version of the protection information). In particular, the control structure 230 includes a number of memory cells equal to the number of bundles 220 available in the protection subset 210 (N=32 in such case); the current bundle (220) is identified by the number of bits at the logical level '0' (i.e., by the number of cells which are programmed therein). Thus, the control structure 230 moves from a configuration having all the memory cells erased (i.e., at the logical state '1') which addresses the first bundle 220, to a configuration having all the memory cells programmed (i.e., at the logical state '0'), which addresses the last bundle 220 (i.e., the $N^{th}$ one).

In such case as well, the bits of the pointer that are stored in the control structure 230 are grouped in various words (in the example at issue, 32/8=4 words).

Figure 3:
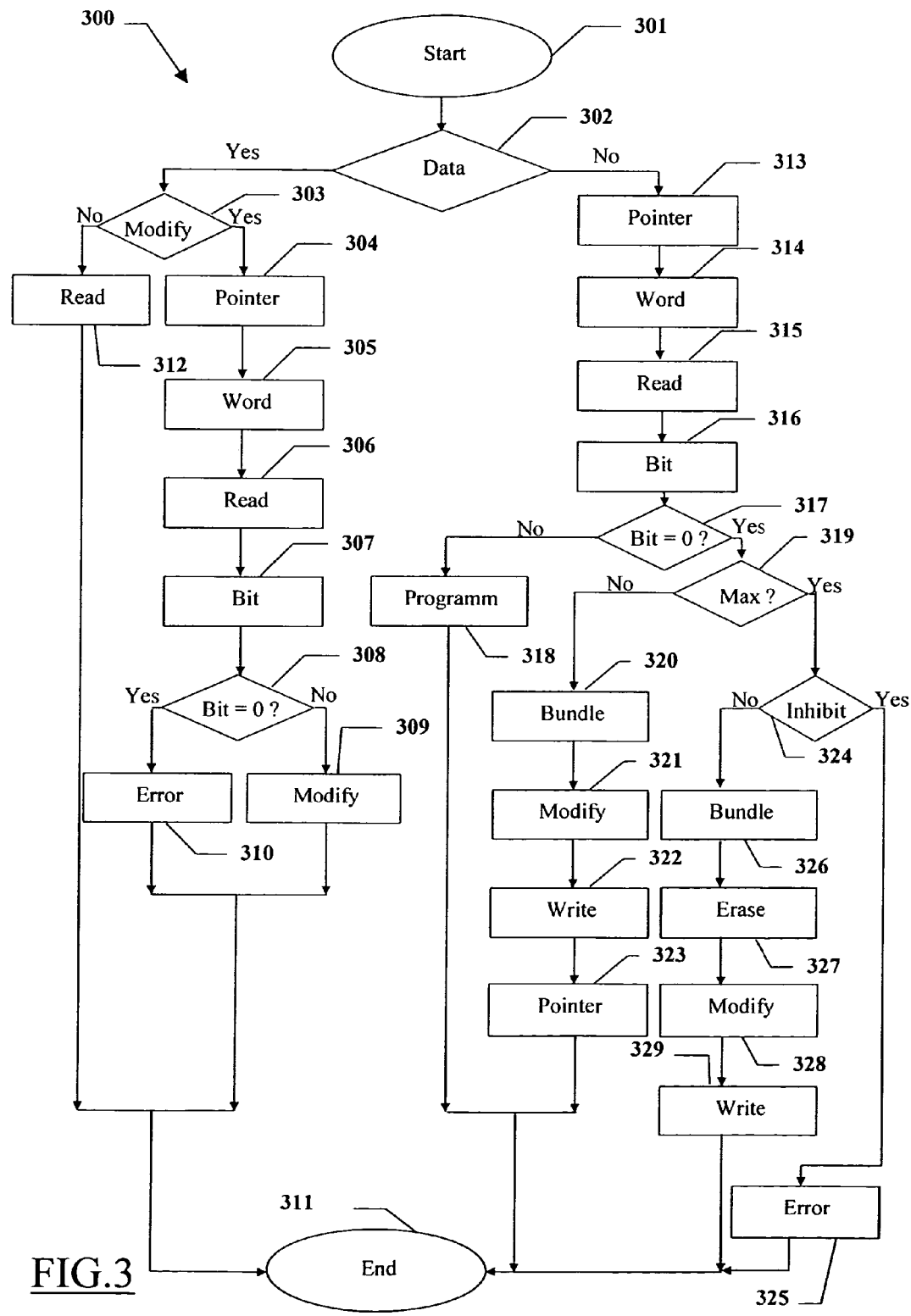
FIG. 3 shows a flowchart explaining various operations that can be performed on the memory device according to an embodiment of the present invention.

Referring to FIG. 3, a method 300 is shown that describes the various operations that can be performed on the memory device. The method 300 starts at the block 301 and then moves to the block 302, wherein the activity flow branches according to the operation to be performed on the selected sector of the memory device.

In case the operation relates to the memory cells that store generic data, the method 300 verifies at the block 303 if a modification of such data is required. In a positive case, the method at the block 304 decodes the address represented by the content of the pointer (stored in the control structure).

Such result is obtained by decoding the thermometric code of the pointer (in which the address is represented by the number of bits at the logical value '0') into the corresponding binary code.

Then, the method 300 at the block 305 identifies the word in the current bundle relating to the selected sector (by adding a corresponding offset to the address obtained above). Then, such word is read at the block 306. Moving to the block 307, the protection bit associated with the selected sector which should be modified is extracted from the read word. The method 300 verifies at the block 308 if such sector is protected from updating operations (i.e., the protection bit is at the logical value '0'). In negative case, the method 300 performs the required data update at the block 309; vice versa, the method 300 reaches an error condition at the block 310. In both cases, thus the method 300 ends at the block 311.

In the case in which the verification block 303 has a negative result, no updating operation involves the selected sector and the method 300 at the block 312 reads the data stored in the sector, so ending at the block 311.

Returning to the block 302, in the case the operation to be performed relates to cells that store the protection information, the method 300 (as described above) decodes the content of the pointer at the block 313, identifies the word in the current bundle relating to the selected sector at the block 314, and thus reads it at the block 315. Moving to the block 316, the protection bit associated to the selected sector that should be modified is extracted from the read word. Thus, the method 300 branches at the block 317 according to the required update. If the selected sector has to be protected (i.e., the protection bit must change from the logical value '1' to the logical value '0') the method 300 programs the protection bit at the block 318, so ending at the block 311. Vice versa, when the selected sector has to be unprotected (i.e., the protection bit must change from the logical value '0' to the logical value '1') the method 300 verifies at the block 319 if the maximum number of possible versions of the protection information has been reached (i.e., the pointer to its current version is equal to N). In negative case, the method 300 at the block 320 reads the whole content of the current bundle (i.e., all its words).

Proceeding to the block 321, the protection bit for the selected sector is updated accordingly (from the logical value '0' to the logical value '1'). The new version of the protection information so obtained is written into the next available bundle at the block 322. Thus, the method 300 updates the pointer at the block 323, so bringing a further bit to the logical level '0'; such result is obtained by programming the corresponding cell of the control structure. It should be noted that this allows updating the pointer without any erasing operation. Thus, the method 300 ends at the block 311. In case of positive verification at the block 319, the method 300 branches at the block 324 according to the configuration of the memory device.

In particular, if the memory device is set for inhibiting further modifying operations, the method 300 reaches an error condition at the block 325, so ending at the block 311. Such choice ensures that the sector storing the protection information is never erased (however limiting the number of the possible unprotection operations). Alternatively, the method 300 at the block 326 reads the whole content of the current bundle. Moving to the block 327, the sector that stores the protection information is erased (after saving the possible generic data stored therein in a buffer area). Thus, the method 300 moves to the block 328 wherein it modifies the protection bit relating to the selected sector.

The new version of the protection information so obtained is written into the first bundle at the block 329 (restoring the possible generic data previously stored); such bundle is automatically addressed by the respective pointer (since all its bits are at the logical level '1'). Thus the method 300 ends at the block 311. Instead, in such case no limit exists for the number of unprotection operations (at the cost of accepting the erasing of the sector which stores the protection information occasionally).

The above-described method allows, within a number of unprotection operations of the sector set a priori, modifying the protection information of the memory device without performing any erasing operation.

In fact, in the case the user desires to protect a selected sector, the method involves a suitable programming operation of the corresponding protection bit. Vice versa, when the user desires to unprotect a protected sector the protection information is stored in a new bundle. The starting configuration of the new bundle has all its cells erased, so allowing the programming of the cells storing the protection bits of the protected sectors, and leaving the protection bit corresponding to the selected sector at the logical value '1' (which then results non-protected).

This allows substantially reducing the updating times of the protection information and increasing the security level of the device in case of supply voltage drops; moreover, such solution limits the electric stress of the corresponding memory cells.

In addition, it is possible to avoid the presence of a dedicated sector for the protection information only.

It should be noted that the convention chosen for the meaning of the protection bit allows protecting the sectors (by programming the respective cells) in a simple and fast way, whereas only their unprotection operation (more infrequent) requires the writing operation of a new version of the protection information.

Naturally, in order to satisfy local and specific requirements, a person skilled in the art may apply to the solution described above many modifications and alterations. Particularly, although the present invention has been described with a certain degree of particularity with reference to preferred embodiments thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the memory device has a different structure or includes equivalent components (for example with multi-level or phase-change memory cells, with a different number of sectors, with words having a different length and the like); moreover, the reference to the set-top boxes is not to be intended as a limitation (with the memory device that can be used in any other application).

In any case, an application wherein a new version of the protection information is written indiscriminately in response to any updating request is not excluded (even if it is obviously less advantageous).

Similar considerations apply if the protection information is represented by two or more protection bits for each sector.

In addition, the memory device can include a different maximum number of versions of the protection information.

Moreover, it will be apparent to those skilled in the art that the additional features providing further advantages are not essential for carrying out the invention, and they may be omitted or replaced with different features.

For example, the use of a reversed convention for the meaning of the protection bits is possible.

The principles of the invention are not limited to the proposed control structure; for example, it is possible to associate a validity bit to each bundle (which is reset at the writing of a new version of the protection information).

Moreover, it is not essential that the sector storing the protection information stores generic data as well.

Alternatively, it is also possible to store the bundles and the control structure in different sectors of the memory device.

Finally, the memory device can only support the inhibition of the writing of the new version of the protection information at the reaching of the maximum number or it can be always involve the erasing of the respective sector.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A non-volatile memory device of a flash type, comprising:
   first memory cells for storing data;
   second memory cells coupled to the first memory cells, the second memory cells for storing protection information for the first memory cells that is updated through writing a plurality of versions of the protection information in the second memory cells wherein each version of the protection information to be stored in a different bundle of said second memory cells; and
   third memory cells coupled to the second memory cells, the third memory cells to identify a current version of the plurality of versions of the protection information through a number of the third memory cells being programmed wherein each third memory cell for a corresponding bundle and respective version of the protection information and each respective third memory cell is programmed responsive to the writing of the corresponding new version of the protection information.

2. The memory device according to claim 1 wherein the updating includes modifying the current version responsive to a request of updating that does not imply the erasing of any of the corresponding second memory cells, and writing a new version of the protection information and identifying responsive to a request of updating that implies the erasing of at least one of the corresponding second memory cells.

3. The memory device according to claim 1 wherein the memory device is organized in a plurality of sectors of memory cells, each one being individually erasable, the first memory cells distributed in said sectors, and wherein the protection information includes a plurality of bits, each bit for a corresponding sector and each bit adapted to take a first or a second logical value indicative of an updating protected status of the corresponding sector, respectively.

4. The memory device according to claim 3 wherein each bit is stored in a corresponding one of the second memory cells, the first value corresponding to the erasing and the second logical value corresponding to the programming of the corresponding second memory cell.

5. The memory device according to claim 1 wherein the second and third memory cells are included in a same sector.

6. The memory device according to claim 5 wherein said same sector further includes at least one of the first memory cells.

7. The memory device according to claim 1 wherein the second memory cells are adapted to store a predetermined maximum number of versions of the protection information, the updating further including erasing the second memory cells and writing a first version of the protection version responsive to the exceeding of the predetermined maximum number of versions.

8. The memory device according to claim 1 wherein the second memory cells are adapted to store a predetermined maximum number of versions of the protection information, the updating further including inhibiting the writing of the new version responsive to the exceeding of the predetermined maximum number of versions.

9. A circuit, comprising:
a memory circuit comprising first, second, and third memory cells and adapted to store a plurality of versions of protection information of the first memory cells in the second memory cells wherein each version of the protection information to be stored in a different bundle of said second memory cells, the the third memory cells to identify a current version of the protection information from the plurality of versions of the protection information through a number of the third memory cells being programmed wherein each third memory cell for a corresponding bundle and respective version of the protection information and each respective third memory cell is programmed responsive to the writing of the corresponding new version of the protection information.

10. The method of claim 9 wherein the memory circuit is adapted to update the current version of the protection information without erasing any of the second memory cell.

11. The method of claim 10 wherein the memory circuit is adapted to write protection information and erasing at least a portion of the second memory cell.

12. The method of claim 11, further comprising protection bits associated with at least the first and second memory cells to protect against writing and erasing of selected cells in the second and third memory cells.

13. The method of claim 9 wherein the third memory cells are adapted to store versions of the protection information.

14. A method for operating a non-volatile memory device of flash type including first memory cells for storing data and second memory cells for storing protection information of the first memory cells, the method comprising:
updating the protection information by writing a plurality of versions of the protection information in the second memory cells wherein each version of the protection information is stored a different bundle of said second memory cells; and
identifying a current version of the protection information through a number of third memory cells being programmed wherein each third memory cell for a corresponding bundle and respective version of the protection information and each respective third memory cell is programmed responsive to the writing of the corresponding new version of the protection information.

15. The method of claim 14, comprising modifying a current version in response to a request to update without erasing corresponding second memory cells.

16. The method of claim 14, comprising writing a new version of the protection information and erasing at least one of the corresponding second memory cells.

17. The method of claim 14, comprising setting a bit corresponding to the first memory cells to indicate an updating of protection status.

18. The method of claim 17, comprising storing the bit in a corresponding second memory cell.

19. The method of claim 14, comprising writing a corresponding version of the protection information in a third memory cell.

* * * * *